2 Sheets--Sheet 1.

R. M. McGRATH.
Corn-Shellers.

No. 137,942.      Patented April 15, 1873.

Witnesses:
Thos. P. Parker.
Robert Everett.

Inventor,
Robert M. McGrath
by Atty Thos. P. Everett

2 Sheets--Sheet 2.

R. M. McGRATH.
Corn-Shellers.

No. 137,942. Patented April 15, 1873.

Witnesses.
Thos. T. Parker.
Robert Everett.

Inventor,
Robert M. McGrath
by Atty Thos. T. Everett

UNITED STATES PATENT OFFICE.

ROBERT M. McGRATH, OF LA FAYETTE, INDIANA.

IMPROVEMENT IN CORN-SHELLERS.

Specification forming part of Letters Patent No. 137,942, dated April 15, 1873; application filed July 8, 1872.

*To all whom it may concern:*

Be it known that I, ROBERT M. MCGRATH, of La Fayette, in the State of Indiana, have invented a Combined Corn Sheller and Cleaner, of which the following is a specification:

My invention has reference to that class of machines whereby the corn will be shelled from the cob and perfectly cleaned at one continuous operation; and consists in the relative arrangement, with the shelling apparatus, of the sieves and fan-blast; and, further, in the combination, with the elevator, of a seive or perforated plate, chute, and recess, all as more fully herein set forth.

Figure 1:
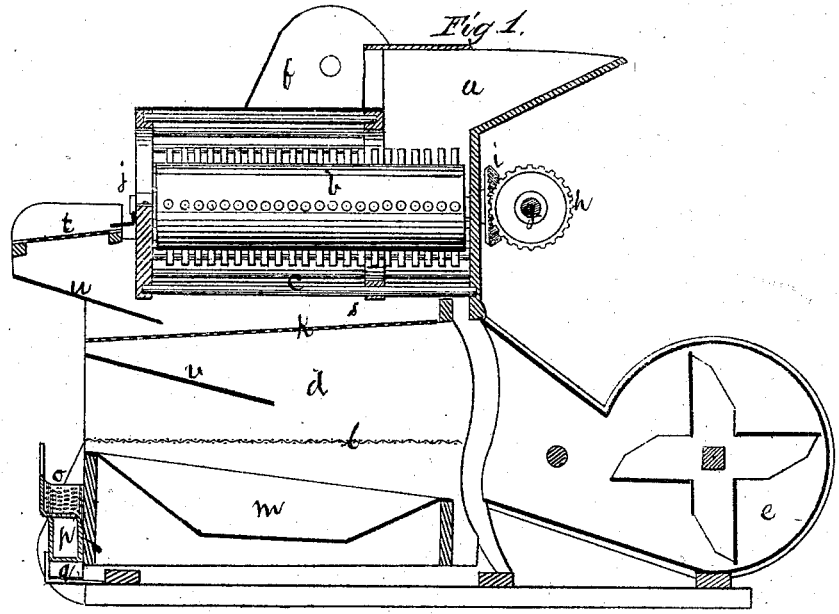
Figure 2:
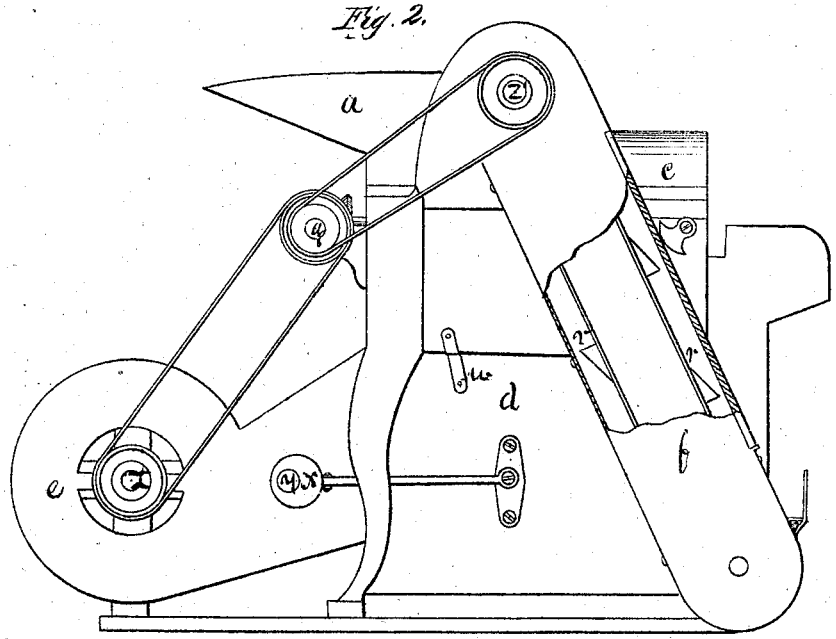
Figure 3:
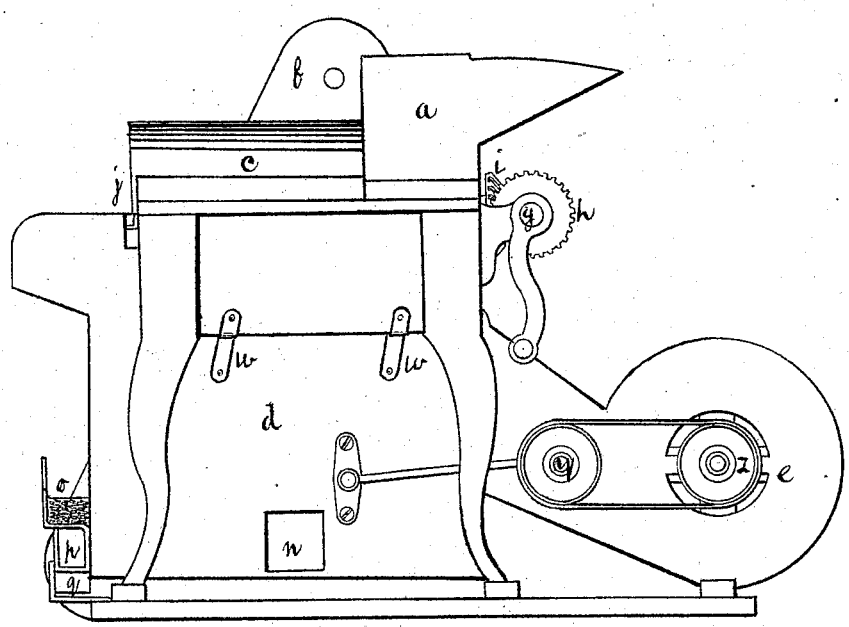
Figure 4:
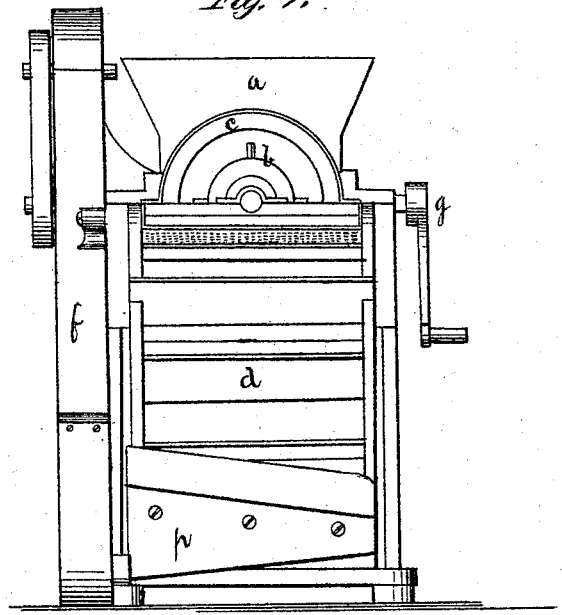

The drawing hereof shows such a machine, Figure 1 being a view by longitudinal section; Fig. 2, a view of one side of the machine; Fig. 3, a view of the other side of the machine; and Fig. 4, an end view.

The several parts of the machine are indicated thus:

$a$, the hopper; $b$, a rotating toothed shaft, surrounded by a cylinder, $c$, constituting the sheller; $d$, the cleaner, made up of sieves or riddles and chutes; $e$, the fan-blower; $f$, an elevator; $g$, the crank-shaft. A beveled wheel, $h$, on the crank-shaft gears into a like wheel, $i$, on the end of the shaft $b$, by which means the toothed shaft $b$ is rotated. Cylinder $c$ is shown made up of rods, surrounded by a shell. In being shelled the ears of corn will, therefore, be acted upon between the teeth and the rods, the corn passing between the rods, and the cobs passing out of the end $j$ of the cylinder. The greater part of the corn will pass through the riddles or sieves $k$ and $l$ into the receptacle $m$, and be delivered through the outlet $n$. Such grains as may be blown out from the cleaner from off the sieves $k$ and $l$ will drop upon the perforated plate $o$, passing through it into the chute $p$ and into the recess $q$, from which, by the buckets $r$ of the elevator, they will be carried up and delivered onto the sieve $k$ at $s$. Such grains as may come out from the sheller with the cobs will pass through the plate $t$ down plate $u$ to the sieve $k$. Plates $u$ and $v$ are guide-plates or chutes. The cleaner has suitable guides in its frame, and suspending-bars $w$. It derives its reciprocating motion from the rod and eccentric $x$ on the shaft $y$. The pulley of shaft $y$, by a band, is moved by the pulley of shaft $z$ of the fan-blower $e$, shaft $z$ deriving its motion from the crank-shaft $g$, from which shaft, also, the shaft $z'$ of the elevator has its motion, the necessary gearing therefor being shown by Fig. 2.

To the construction of the shelling apparatus proper I here lay no claim, the advantages of my peculiar arrangements being that the blast from the fan is enabled to act on a dispersed stratum of corn, as the corn falls directly from the sheller onto the sieve, and not upon a chute which interrupts the blast, thus cleaning the corn more readily and effectually than were it subjected only to a blast in such stream as would fall from the edge of a chute.

What I claim is—

1. The combination and peculiar arrangement with the corn-sheller, consisting of the hopper $a$, toothed shaft $b$, and rod-cylinder $c$, of the sieves $k$ and $l$, chutes $u$ and $v$, plate $t$, and fan-blast $e$, substantially as herein set forth.

2. The arrangement of the perforated plate $o$, chute $p$, and recess $q$, with the elevator $f$, as and for the purposes herein recited.

This specification signed this 24th day of May, 1872.

ROBERT M. McGRATH.

Witnesses:
 THOS. T. EVERETT,
 ROBERT EVERETT.